(12) United States Patent
Clark et al.

(10) Patent No.: US 8,944,939 B2
(45) Date of Patent: Feb. 3, 2015

(54) INERTIAL MEASUREMENT OF SPORTS MOTION

(71) Applicants: William W. Clark, Wexford, PA (US); Jeremy R. Romeiko, Quincy, FL (US)

(72) Inventors: William W. Clark, Wexford, PA (US); Jeremy R. Romeiko, Quincy, FL (US)

(73) Assignee: University of Pittsburgh—Of the Commonwealth System of Higher Education, Pittsburgh, PA (US)

( * ) Notice: Subject to any disclaimer, the term of this patent is extended or adjusted under 35 U.S.C. 154(b) by 0 days.

(21) Appl. No.: 13/760,733

(22) Filed: Feb. 6, 2013

(65) Prior Publication Data

US 2013/0204411 A1    Aug. 8, 2013

Related U.S. Application Data

(60) Provisional application No. 61/595,970, filed on Feb. 7, 2012.

(51) Int. Cl.
*A63B 69/00* (2006.01)
(52) U.S. Cl.
USPC .............................................. 473/453; 463/36
(58) Field of Classification Search
USPC .............................. 473/453; 434/252; 463/31
See application file for complete search history.

(56) References Cited

U.S. PATENT DOCUMENTS

| 5,118,102 | A  | * | 6/1992  | Bahill et al. ................. | 473/564 |
| 6,042,492 | A  | * | 3/2000  | Baum .......................... | 473/453 |
| 6,533,675 | B2 | * | 3/2003  | Funk ........................... | 473/222 |
| 6,537,076 | B2 | * | 3/2003  | McNitt et al. ................ | 434/252 |
| 6,821,211 | B2 | * | 11/2004 | Otten et al. .................. | 473/219 |
| 6,959,259 | B2 | * | 10/2005 | Vock et al. ................... | 702/142 |
| 7,021,140 | B2 | * | 4/2006  | Perkins ......................... | 73/493 |
| 7,234,351 | B2 |   | 6/2007  | Perkins |  |
| 2010/0204616 | A1 | * | 8/2010  | Shears et al. ................. | 600/595 |
| 2011/0025853 | A1 | * | 2/2011  | Richardson .................. | 348/159 |
| 2011/0230986 | A1 | * | 9/2011  | Lafortune et al. ............ | 700/93 |
| 2012/0139731 | A1 | * | 6/2012  | Razoumov et al. ......... | 340/573.1 |

FOREIGN PATENT DOCUMENTS

| WO | 2004049943 A1 | 6/2004 |
| WO | 2009061283 A2 | 5/2009 |
| WO | 2009061283 A3 | 5/2009 |

* cited by examiner

*Primary Examiner* — Masud Ahmed
(74) *Attorney, Agent, or Firm* — Kegler Brown Hill & Ritter; James J. Pingor

(57) ABSTRACT

Systems and methods of motion tracking are disclosed that can be used in connection with sports motion. Such a method can include placing one or more inertial measurement units (IMUs) on at least one of a person or one or more pieces of equipment, recording motion data associated with the at least one of the person or the one or more pieces of equipment, and synchronizing the recorded motion data. The method can also include analyzing the synchronized motion data in connection with a motion standard, and generating feedback based at least in part on the analyzed motion data.

14 Claims, 8 Drawing Sheets

INERTIAL MEASUREMENT OF SPORTS MOTION

CROSS-REFERENCE TO RELATED APPLICATIONS

This application claims the benefit of U.S. Provisional Patent application Ser. No. 61/595,970 entitled 'INERTIAL MEASUREMENT OF SPORTS MOTION' and filed Feb. 7, 2012. The entirety of the above-noted application is incorporated by reference herein.

BACKGROUND

The history of animal or human motion studies dates back to the $19^{th}$ century and the use of video cameras. After over one hundred years of development, the optical motion capture system has been widely used in human motion study, especially in medical rehabilitation and sports such as golf, baseball bat swing and pitching. However, the shortcomings of video camera-based motion capture systems are still obvious in the study of sports motion, which features high speed, short duration and path.

Even a high speed camera (up to 250 FPS from OptiTrack) cannot provide a high enough sampling rate to grasp details of human segment motion while pitching a baseball, and to establish the complete 3D motion trajectory, a camera network needs to be set up, limiting the method mainly to laboratory environments. In addition, the analysis required of images after capture results in additional expense, not to mention unwanted delay in the use of the information. The benefit of video analysis is that it provides position information directly from the images. Inertial measurement units (IMUs), on the other hand, require sophisticated manipulation of the acceleration and velocity data to acquire position information.

SUMMARY

The following presents a simplified summary of the innovation in order to provide a basic understanding of some aspects of the innovation. This summary is not an extensive overview of the innovation. It is not intended to identify key/critical elements of the innovation or to delineate the scope of the innovation. Its sole purpose is to present some concepts of the innovation in a simplified form as a prelude to the more detailed description that is presented later.

The innovation disclosed and claimed herein, in one aspect thereof, comprises systems and corresponding methodologies related to use of inertial measurement devices in the analysis of sports motions, and motions generally. In particular, the focus is on baseball and softball, with emphasis on swinging a bat, but the general concepts can apply to motions in other sports and activities as well, with or without equipment.

In aspects, the innovation can include methods of motion tracking that can be used in connection with sports motion. Such a method can include placing one or more inertial measurement units (IMUs) on at least one of a person or one or more pieces of equipment, recording motion data associated with the at least one of the person or the one or more pieces of equipment, and synchronizing the recorded motion data. The method can also include analyzing the synchronized motion data in connection with a motion standard, and generating feedback based at least in part on the analyzed motion data.

In other aspects, the subject innovation can include a system that facilitates motion tracking. One such system can include a set of one or more inertial measurement units (IMUs). Each IMU of the set can be attached to and records motion data associated with one of a person or at least one piece of equipment. The system can also include a control component that can receive and synchronize the motion data recorded by each IMU of the set, and an analysis component that can analyze the synchronized motion data in connection with a motion standard and can generate feedback based at least in part on the analysis.

To the accomplishment of the foregoing and related ends, certain illustrative aspects of the innovation are described herein in connection with the following description and the annexed drawings. These aspects are indicative, however, of but a few of the various ways in which the principles of the innovation can be employed and the subject innovation is intended to include all such aspects and their equivalents. Other advantages and novel features of the innovation will become apparent from the following detailed description of the innovation when considered in conjunction with the drawings.

DETAILED DESCRIPTION

Figure 1:
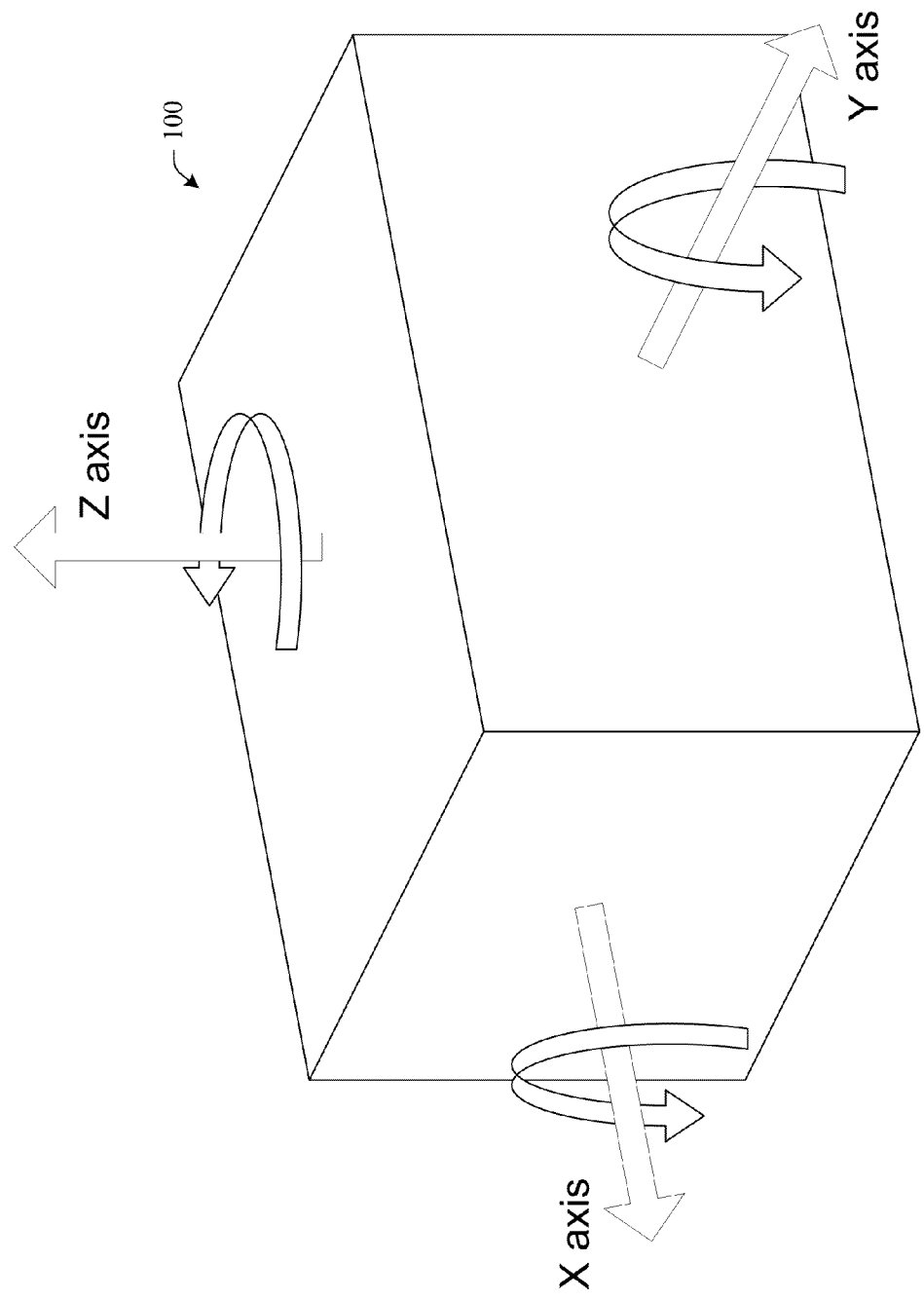
FIG. 1 illustrates a schematic of an inertial measurement unit (IMU) that can be used in connection with systems and methods of the subject innovation.

The innovation is now described with reference to the drawings, wherein like reference numerals are used to refer to like elements throughout. In the following description, for purposes of explanation, numerous specific details are set forth in order to provide a thorough understanding of the subject innovation. It may be evident, however, that the innovation can be practiced without these specific details. In other instances, well-known structures and devices are shown in block diagram form in order to facilitate describing the innovation.

As used in this application, the terms "component" and "system" are intended to refer to a computer-related entity, either hardware, a combination of hardware and software, software, or software in execution. For example, a component can be, but is not limited to being, a process running on a processor, a processor, an object, an executable, a thread of execution, a program, and/or a computer. By way of illustration, both an application running on a server and the server can be a component. One or more components can reside within a process and/or thread of execution, and a component can be localized on one computer and/or distributed between two or more computers.

Referring initially to the drawings, FIG. 1 illustrates a schematic of an inertial measurement unit (IMU) 100 that can be used in connection with systems and methods of the subject innovation. Inertial measurement involves the use of special sensors (namely accelerometers, which measure linear acceleration, and rate gyros, which measure angular velocity, and magnetometers, which measure position with respect to fixed magnetic fields as reference) to obtain accurate information about the motion of a body. Multiple sensors, typically made at very small scales using microelectromechanical systems (MEMS) processes, can be packaged together to form an inertial measurement unit (IMU) such as IMU 100. A conventional IMU contains three accelerometers and three rate gyros for six degree-of-freedom measurement. IMUs, accelerometers, and gyroscopes, along with other sensors, have been used for years in a variety of applications including automotive control, air bags, and lately in a variety of consumer electronics such as gaming systems, tablet computers, and cell phones. The technology is becoming small enough, and the analysis algorithms sophisticated enough, that the tools can be readily used in sports motion analysis such as described herein.

Due to the fast developing MEMS inertial sensor technology, IMUs are gaining more and more attention from the sports motion research community. Featuring small volume and low cost, an IMU is able to provide high sampling rates to capture the small details of human segment motion. Working in so-called strap-down mode (fixed to the rigid body being studied), the IMU can detect complete 6 degree of freedom (DOF) motion information of the object.

The IMU has been introduced into sports motion studies such as bowling balls and golf swings, and preliminary studies of pitching motion. The main advantage of the IMU, compared to the high speed video camera system, is the much higher sampling rate. The IMU system is able to capture the kinematics of the very short acceleration phase of pitching (20-40 milliseconds). The IMU can also detect the acceleration, which is directly related to forces experienced in joints such as wrist, elbow and shoulder.

Figure 2:
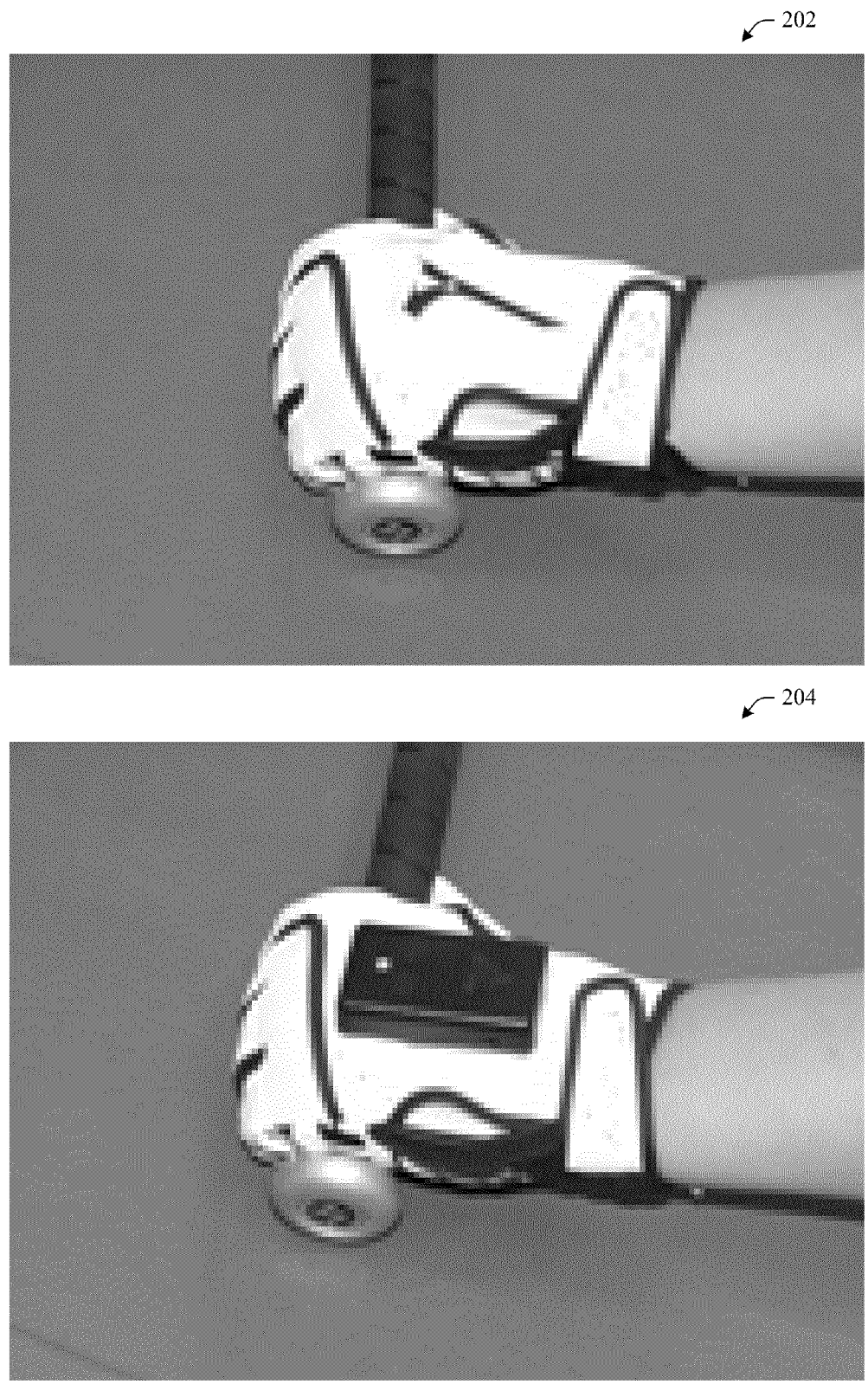
FIG. 2 shows an image of an IMU in a glove and an image of an IMU attached to a glove.

The smallest reported IMU today is 17×20 mm in size approximately 7 grams in weight. FIG. 2 shows an IMU in a glove in image 202, and an attached to a glove in image 204, showing an example placement of an IMU on a body for analysis of sports motion or general motion. Current IMUs are small enough to place on a bat and body parts now, and future designs will be even smaller (small enough for a player to wear without discomfort). Future versions can be made even smaller and be built into the player's uniform and bat for use in games, and even in the ball, if it is made rugged enough to survive the shock of impact with a bat. Commercial versions are available (for example, Xsens, etc.) that can provide a complete solution for wireless IMU network featuring accurate time synchronization communication protocol, large dynamic range (±1200 deg/s of gyro and ±16.3 g accelerometer and magnetometer for orientation detection), compact size and easy to use software interface.

The subject innovation, in various aspects, describes additional methods for using IMUs in sports equipment motion analysis (including proper selection of equipment), in human body motion analysis in sports or in general, and for motion analysis of combinations of equipment and body.

Figure 3:
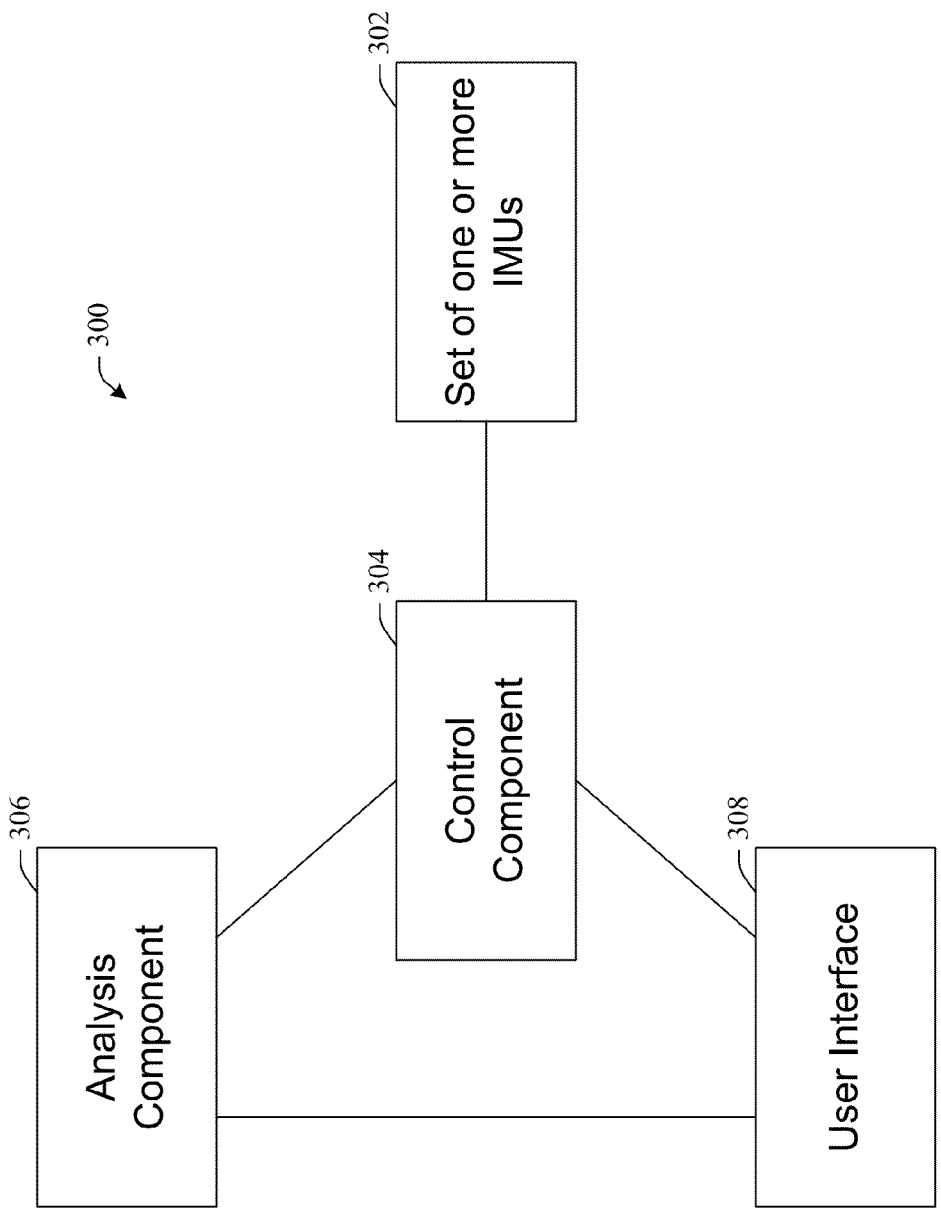
FIG. 3 illustrates a system that facilitates motion analysis in connection with aspects of the innovation.

FIG. 3 illustrates a system 300 that facilitates motion analysis in connection with aspects of the innovation. System 300 can include a set of one or more IMUs 302 that can be attached to at least one of an equipment or a person whose motion is to be analyzed. Each IMU of the set of one or more IMUs 302 can record motion data by measuring linear and/or rotational acceleration associated with a location on the at least one of the equipment or the person (e.g., a joint (e.g., shoulder, elbow, waist, knee, etc.), a hand, a foot, a head, a jointed or fixed point on the equipment, etc.) as a function of time. The number and location(s) of each of the set of one or more IMUs 302 can depend on what particular motion is being studied. For a rigid body, for example (which to a first approximation many segments of the human body (e.g., upper arm, forearm, etc) or sports equipment (e.g., baseball bat) are), the motion has six degrees of freedom, which can be determined by one IMU (although in some situations, internal forces in such objects (e.g., vibrations in a baseball bat, golf club, etc.) may be among motions to be analyzed, and additional IMUs can be used in such situations, etc.). Control component 304 can be communicatively coupled to the set of one or more IMUs 302 (e.g., wired or wirelessly), and can synchronize motion data received from the set of one or more IMUs 302. Control component 304 can provide this synchronized data to analysis component 306 for analysis of the motion data and optionally to a user interface 308 that can be included. The motion data provided from control component 304 can be raw data that can be presented to a user (e.g., either the person whose motion is to be studied, or another person (e.g., coach, trainer, physical therapist, etc.)), such as via a computer, an application ("app") on a phone or other device, etc.

Analysis component 306 can derive further motion data from the synchronized motion data received from control component 304, such as velocity (and angular velocity) and position (and angle) data as functions of time. Additionally, motion can be analyzed in connection with a motion standard (e.g., performance index, prerecorded motion, defined ranges associated with aspects of the motion, etc.), which can be associated with specific sports or other motions, to generate feedback. This feedback can include determination of values of one or more performance indices, points of difference from ideal motions, areas of inefficiency or potential improvement (e.g., to achieve a more effective motion, reduce risk of injury, etc.), equipment recommendations, etc. Although specific examples included herein relate to baseball motions (e.g., swinging a bat, pitching a ball, etc.), these examples are intended to illustrate potential example applications of the subject innovation, which has a broader range of applicability than those encompassed by the examples. User interface 308 can present the generated feedback, as well as motion data, whether measured or derived. This feedback can be used in a variety of ways, depending on the specific motion. For example, as described herein, the feedback can provide a person with information on optimal equipment to be used in a sport (e.g., baseball bat, golf club, etc.), to identify inefficiencies in motions (swing, various pitches, etc.), to assist in learning new skills (e.g., details of the motion can be provided to the person or a coach for analysis, or the motion of the person can be compared to one or more prerecorded or predefined motions associated with expert performance of the motion, and if necessary, adjusted based on differences in body size (e.g., height, etc.)), to avoid injuries, to speed recovery from injuries (e.g., by providing specific feedback in connection with physical therapy exercises, such as by comparison to expert motion, which can then be used by a physical therapist or the person to modify the motion if necessary), etc.

Figure 4:
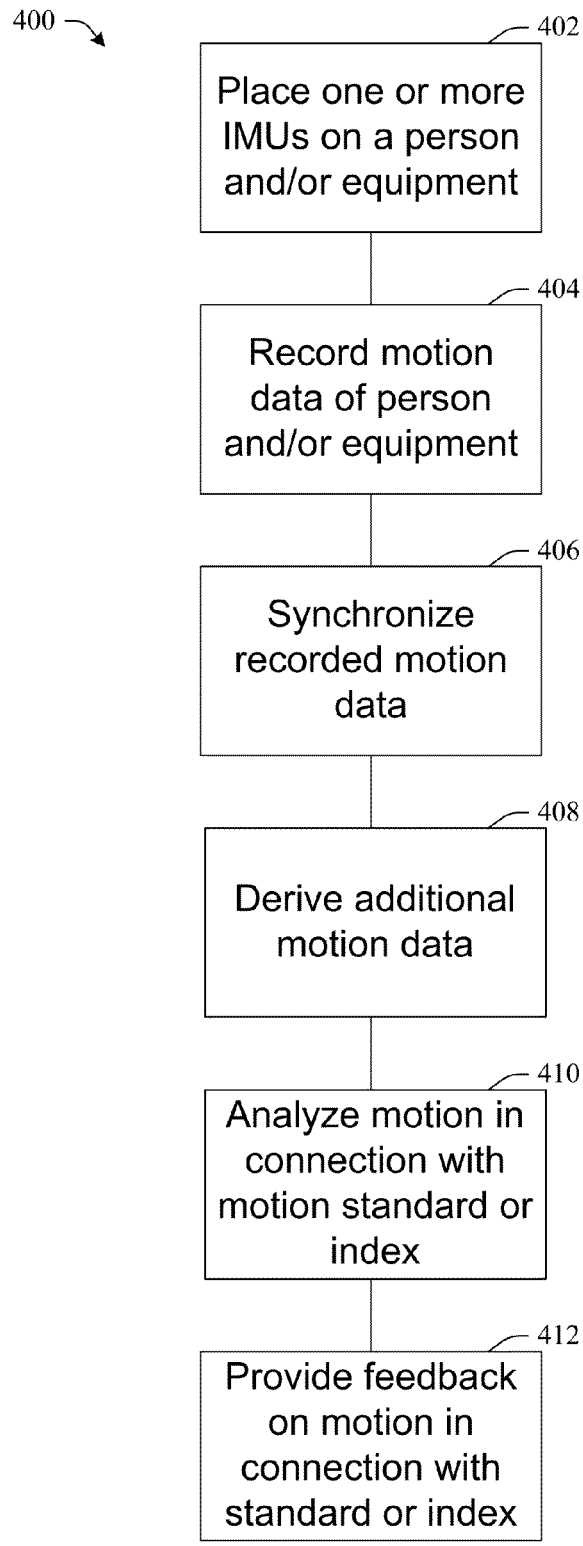
FIG. 4 illustrates a method of analyzing motion in connection with aspects of the subject innovation.

FIG. 4 illustrates a method 400 of analyzing motion in connection with aspects of the subject innovation. While, for purposes of simplicity of explanation, the one or more methodologies shown herein, e.g., in the form of a flow chart, are shown and described as a series of acts, it is to be understood and appreciated that the subject innovation is not limited by the order of acts, as some acts may, in accordance with the innovation, occur in a different order and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the innovation.

Method 400 can begin at 402 by placing one or more IMUs on at least one of a person or equipment associated with the motion to be analyzed. At 404, motion data of the person at least one of a person or the equipment can be recorded via the one or more IMUs, which can measure linear and rotational acceleration throughout the motion. At 406, the recorded motion data from each of the one or more IMUs can be synchronized. At 408, additional motion data (e.g., velocity, position, etc.) can be derived from the recorded motion data (e.g., based on initial conditions; for example, relative to a position and velocity at the start of testing, relative to a measured fixed reference as measured by one or more magnetometers, or if a predetermined "home" location were set, then velocity and position relative to that "home" location could be determined (as well as relative to other IMUs), etc.). At 410, the motion can be analyzed in any of a variety of ways as described herein, such as in connection with a motion standard such as an ideal or expert motion, one or more performance indices (e.g., performance indices discussed herein, etc.), motions of other players or persons, historical measurements of the same motion by the same person, etc. The method can conclude at 412 by providing feedback on the motion data in connection with the analysis performed in act 410. This feedback can be of any of the varieties discussed herein, such as detailed analysis of the motion, comparison of the motion to the same motion by the same or other persons, determination of a performance index in connection with the motion, recommendation of equipment, etc.

Particular example implementations of aspects of the subject innovation are described herein in connection with baseball, although it is to be understood that these examples are included to illustrate aspects of the innovation, and are not intended to be limiting, as the invention can be applied in connection with motion in other sports or with non-sports motion. There are a wide range of useful applications of inertial measurement in baseball. Below is an example list of areas where these techniques can make an impact in performance evaluation, skill training, injury prevention, and rehabilitation.

Figure 5:
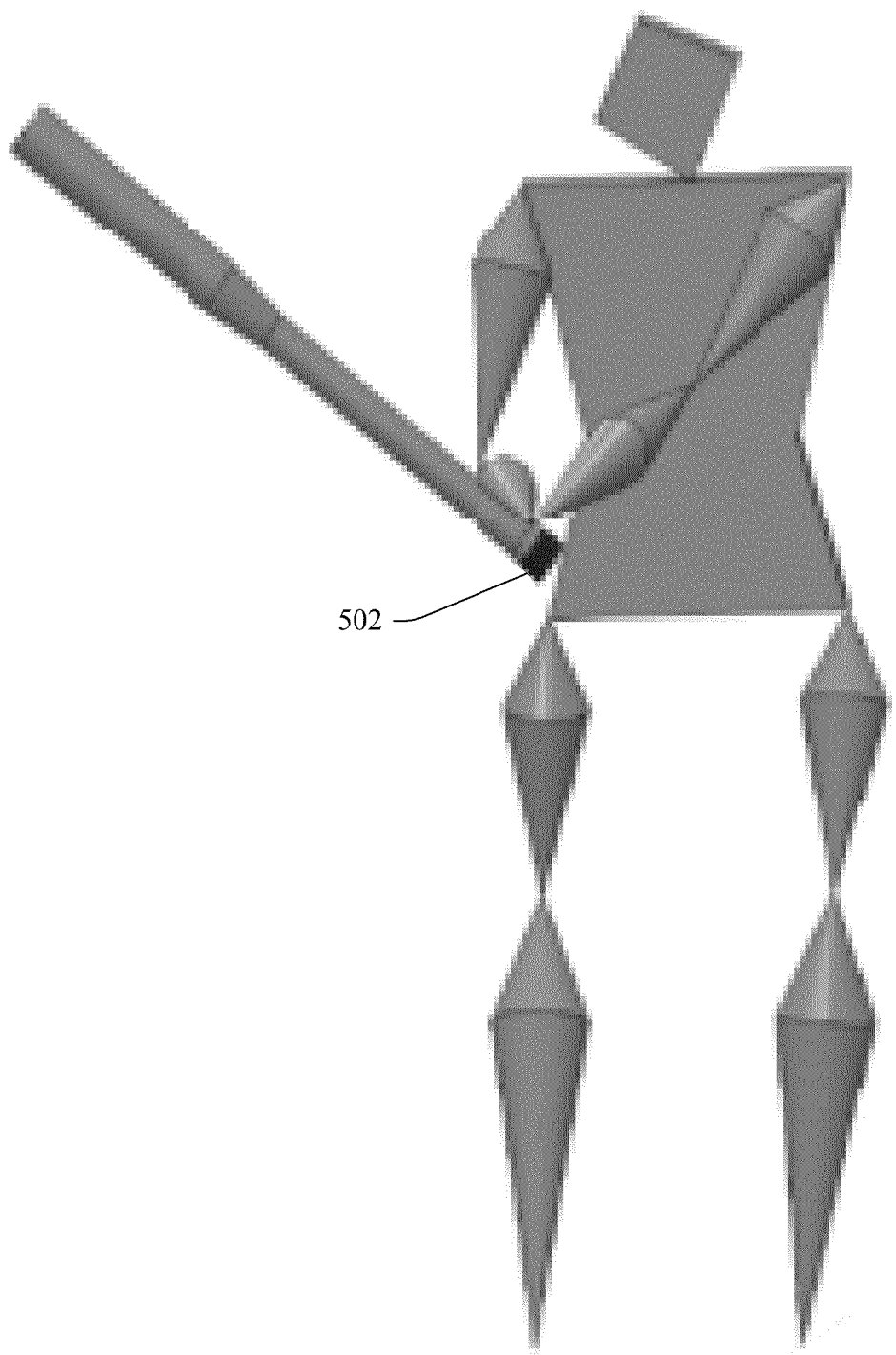
FIG. 5 illustrates a bat analysis system using a single IMU placed on the bat.

Bat swing analysis is one potential application of systems and methods of the subject innovation. Regarding analyzing bat motion alone, efforts have been made in conventional techniques to incorporate hardware and software for reconstructing and analyzing bat motion, but the focus has been on attaching a specialized IMU-based device to the equipment itself (or analyzing the motion of the equipment only), using an attachment mechanism as shown in FIG. 5, illustrating bat analysis using a single IMU 502 placed on the bat. Traditional systems suggest measurement of six degrees-of-freedom in order to effectively analyze desired motion. In contrast, for some applications, it is possible to use fewer than six degrees of freedom to obtain useful information (for example, in connection with a bat selection method described below). For example, the IMU attached to the bat may use one rate gyro (to measure rotational velocity about a vertical axis and linear acceleration in the primary direction of bat motion). In another example, useful key data about a player's swing may be obtained with fewer than six degrees of freedom measurement, such as time from start of swing to contact. In addition, conventional systems describe the use of IMUs that contain angular rate gyros and linear accelerometers.

However, aspects of the subject innovation can be used to monitor and analyze body motion or bat and body motion, as opposed to just bat motion. Bat motion itself is only a small part of the biomechanics of the swing. A great deal of useful information regarding training, rehabilitation, or equipment selection may be obtained by measuring the motion of the player's body, or the body motion in conjunction with the bat motion. Hip rotation, shoulder motion, head motion, hand motion, and possibly other motions should be considered in addition to or independent of the bat itself.

For example, important features of a swing are related to when and where the hitter's hands move in relation to his/her hips. Proper synchrony of hip rotation and hand motion is important to get maximum velocity at contact with the ball. In another example, weight shift is arguably important (and cannot be quantitatively determined with video analysis).

Figure 6:
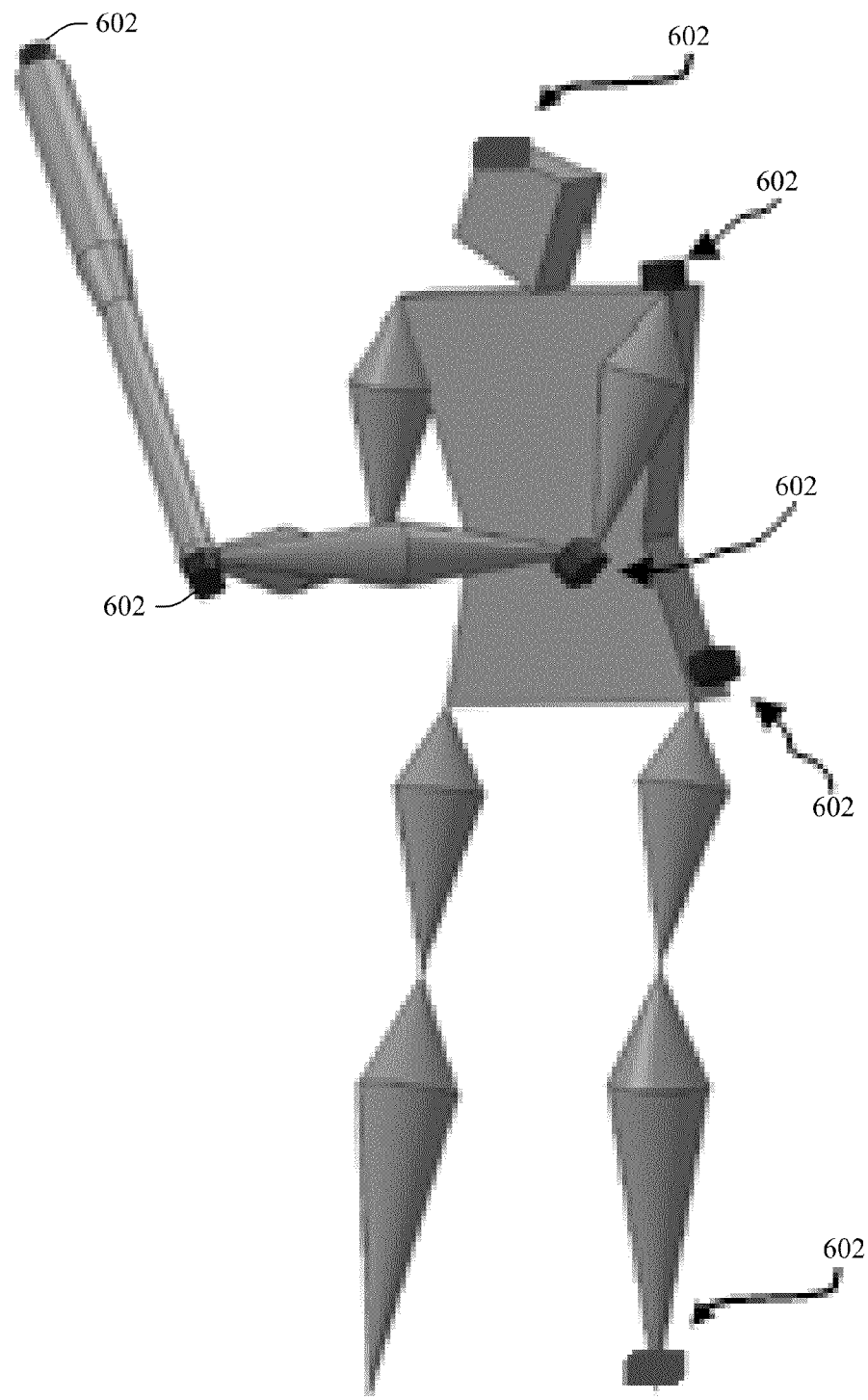
FIG. 6 illustrates a bat analysis system using multiple IMUs in accordance with aspects of the innovation.

Information about the body's motion is independent of the full trajectory of the bat that is described in the above-referenced patents. Using one or more IMUs 602 attached to the body (e.g., at the head, shoulder, elbow, hip, knee, foot, etc.), for example as depicted in FIG. 6 (with or without additional IMU(s) 602 attached to the equipment) has not been practiced. An example of a single IMU attached to the body is shown in image 204 of FIG. 2. An individual IMU 602 may be connected directly to the skin, or may be secured in a glove (e.g. a batting glove), a strap, a wristband, or other removable clothing or device. Each IMU 602 can be used to measure motion of the body part (the hand in this example) during a sports motion (e.g. swinging a bat). Use of multiple IMUs 602 requires synchronization of the IMUs 602 with one another (or post-alignment of the collected data), and can be done with wires for communication and data transfer, or wirelessly. In addition, inverse-dynamics analysis can enable determination of the forces and moments imparted to the bat by the player (and conversely to the player's joints and tissues), which will allow further analysis of performance or rehabilitation. With a simple interface (e.g., even a cell phone), the data can be available immediately to the player or coach.

Another example application is evaluating a player's "hitting efficiency." That is, it is unlikely that every hitter gets the most out of his hitting ability, due to inefficiencies in mechanics. This method provides the ability to determine how much more a hitter could get out of his body if better technique were used.

An example application of bat-swing data is optimal bat selection. In 2010, over 200 different aluminum and composite bats were available in the category of "Youth Baseball," in sizes ranging from 25" 12.5 oz. to 32" 23 oz. Similar choices exist for Youth Softball, as well as for older players in both sports. To a parent, this is a bewildering array of choices, particularly for a purchase that may exceed $400 and yet may last only a year. The state of the art in bat sizing is a set of charts that suggest bat length and weight based on player age and/or height and weight. Alternatively, many parents use rules of thumb that have been passed down over the years (e.g. "use the largest bat that the player can hold straight out to the side with one hand for ten seconds"). A poor choice in bat size can lead to less than optimal performance on the field and possibly bad habits (e.g. poor swing mechanics). One conventional method involves finding the bat with which an individual player can generate maximum ball exit speed from the hitting process, which is arguably the most important measure of hitting performance (issues of bat control and contact aside). The premise is that a player can swing a very light bat at high speed, and that speed decreases as the bat becomes progressively heavier. This has been shown to be true in experimental testing (with the exception in some players who can maintain speed over quite a range of heavier bats until there is a precipitous drop in speed), and both ends of the spectrum are limited by the individual player's biomechanics. The ball exit speed, however, does not go with speed, but rather is a function of momentum exchange due to the ball-bat collision. For lighter bats, less bat momentum results in lower exit speed in spite of increased bat speed. For very heavy bats, even though the bat mass enhances momentum exchange, the reduced bat speed generated by the player diminishes ball exit speed. The result is a parabolic curve, similar to that shown in FIG. 7, which shows a plot of example bat swing characteristics for a typical youth player showing ball exit speed versus bat size. It should be noted, however, than in the plot of FIG. 7, the abscissa is bat mass moment of inertia, and not bat weight as presented in one conventional method. Mass moment of inertia includes both bat weight and length in a single parameter; since a player must select both a bat's weight and length, the method described here utilizes mass moment of inertia instead of weight as the independent variable. Once the optimal mass moment of inertia is determined, a set of corresponding length-weight combinations can be provided to the player from which a choice can be made.

Figure 7:
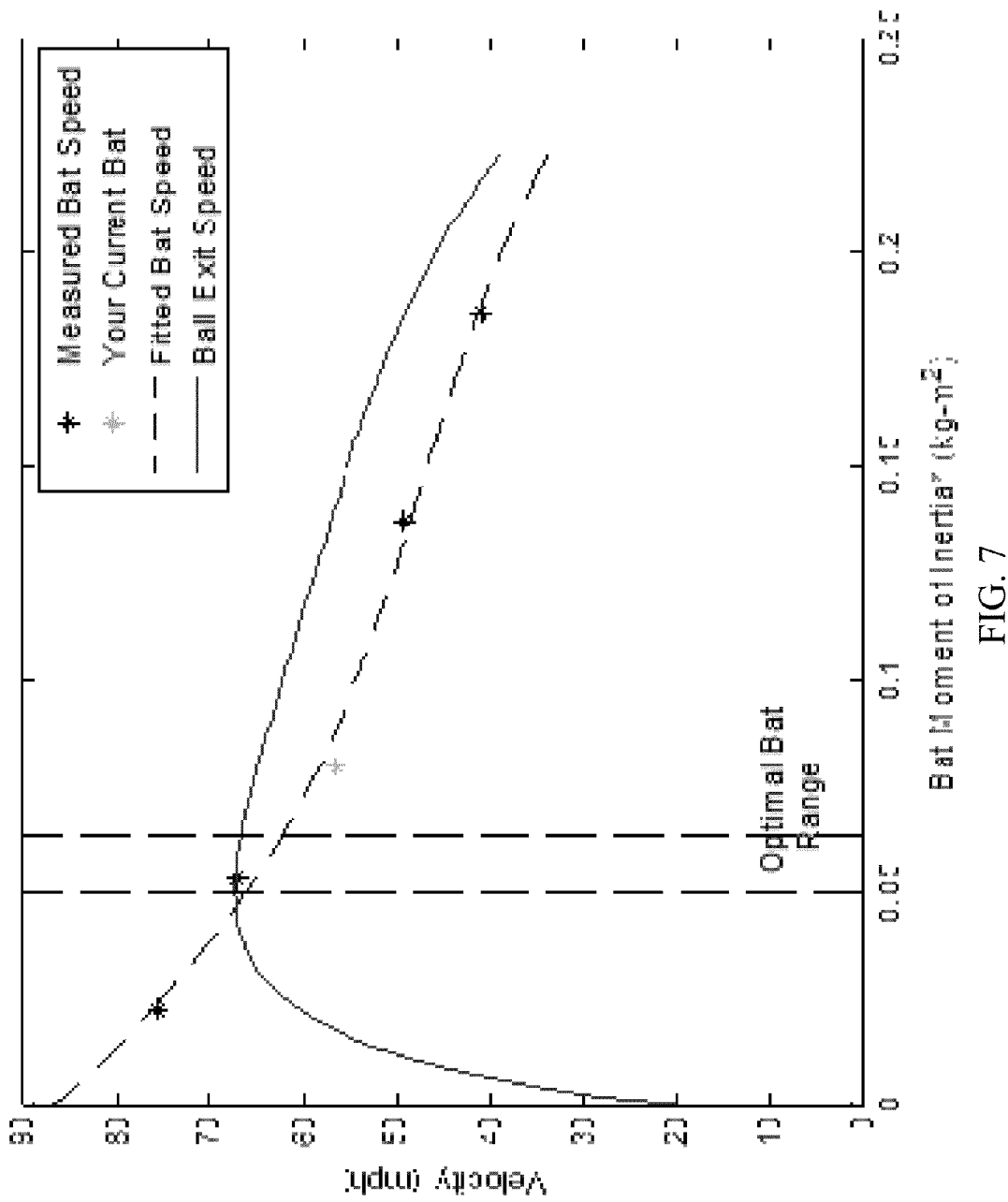
FIG. 7 shows a plot of example bat swing characteristics for a typical youth player showing ball exit speed versus bat size.

The dashed curve in FIG. 7 is a fitted curve from measured bat speed. Typical data shows that approximately five different bat sizes allow for a meaningful curve to be formed. For each measured bat speed the ball exit speed is determined analytically from the ball-bat collision dynamics problem.

An alternative method to approximating ball exit speed is to directly measure ball exit speed with video analysis, radar, IMU, or a combination of these. The benefit of these measurements is that in addition to exit speed, ball exit trajectory could also be determined, giving additional information to be used in a bat performance algorithm. In order to create a more sensitive parameter than ball exit speed for selecting the optimum bat, the calculated or measured ball exit speed can be used to calculate and plot ball exit kinetic energy. The squared effect of the energy term enhances the peak of the curve compared with that shown in FIG. 7.

As described above, the ball velocity (or kinetic energy) is low on either end of the curve due to decreased momentum exchange (for lightweight bats because of low bat mass and for heavy bats because of low bat speed). There is a distinct peak in the middle of the curve, denoting the optimal bat for that particular player. This curve has been observed for dozens of tested players in connection with the subject innovation as well as in the work of others, providing clear quantitative data for the choice of a bat. As an alternative to determining a specific optimal bat, one may use the data to determine an optimal range of bats, as shown in FIG. 7, which is determined by finding the mass moment of inertia values corresponding to a +/− change in exit velocity (or kinetic energy) from the peak value.

The conventional bat selection system discussed above describes using an optical gate system for measurement of bat speed. The conventional 'bat selector' system involves two lasers and two accompanying photodiodes that are set up at the typical point of impact in a swing in relation to the player's body. During testing the player swings bats through the laser beams, and bat speed at impact is obtained by measuring the time required for the bat to break the two laser beams. While the setup is simple and provides accurate information about bat velocity, it is not conducive to outdoor use or for testing during which the ball is moving. In addition, the optical method does not provide other information about the swing that may be useful for improved bat selection algorithms. Nonetheless, the method has been shown to be effective and simple. One may consider the conventional bat selection method to use a simple optimization based on a single parameter performance index, shown in equation 1:

$$J = W_1 V_{ball} \qquad (1)$$

Where J is a performance index, $V_{ball}$ is the calculated or measured ball exit speed, and $W_1$ is a weighting factor.

Using data from IMUs can provide more general testing for optimal bat selection. For example, IMUs can enable the test in which the player can swing to hit moving balls (contact with the ball can occur at any location, and bat speed at collision can be extracted from the data), and bat motion information can be extracted for use in a bat-selection algorithm. In addition, one can develop alternative algorithms for optimal bat selection that include other parameters of the swing.

For example, in equation 1, one could define J to be a weighted performance index, such as in equation 2:

$$J = W_1 KE_{ball} + \frac{W_2}{t_r} + W_3 CF \qquad (2)$$

or equation 3, $$J = W_1 V_{ball} + \frac{W_2}{t_r} + W_3 CF \qquad (3)$$

where $V_{ball}$ is the calculated or measured ball exit speed after collision with the bat; $KE_{ball}$ is the ball exit kinetic energy after collision with the bat; $t_r$ is a critical time of the swing, such as time from start to maximum speed, or time between maximum bat speed and impact with the ball; CF is a "control factor" describing some aspect of bat control during the swing such as angle of the bat at a specific critical point of the swing such as bat contact with the ball; and $W_i$'s are weighting factors for the optimization. Unlike with the optical measurement device discussed above, variables such as $t_r$ and CF can be measured and/or extracted from IMU measurement of swings, and can therefore be readily used in such an algorithm.

An optimization using the newly-defined J of equations 2 or 3 would be done similarly to that shown in FIG. 7, but where instead of plotting ball exit speed versus bat moment of inertia, one would plot J versus moment of inertia, and then determine the moment of inertia value or range that maximizes or minimizes the defined J.

In general the performance index may be written as:

$$J = W_{ball_1} BEF_1 + W_{ball_2} BEF_2 + \ldots + W_{bat_1} CF_1 + W_{bat_2} CF_2 + \qquad (4)$$

where $BEF_i$ is a 'ball exit factor' that may be measured or calculated, $CF_i$ is a bat swing control factor as described above, $W_{ball_i}$ and $W_{bat_i}$ are constant weighting factors used in the optimization. The $BEF_i$ terms may be measured, for example, with video, radar, or IMU imbedded in the ball; or each $BEF_i$ may be calculated, for example, based on bat kinematics and ball-bat collision mechanics (as described above). Example ball exit factors include ball exit speed, or a ball exit factor dependent on ball exit speed such as ball kinetic energy, or a ball exit factor dependent on ball exit trajectory such as ball travel distance and/or direction, or a ball exit factor may be dependent on a ball rotation direction or velocity, or other ball exit factors related to the measured and/or calculated ball exit conditions from the ball-bat collision. Since the IMU obtains information about the full swing trajectory, many different control factors, $CF_i$ and combinations of control factors may be used, for example a control factor that is dependent on the angle of the bat at contact with the ball or a factor that is dependent on the velocity direction of the bat at contact with the ball, or a factor that is dependent on the rotational velocity(ies) of the bat at contact with the ball, or a factor that relates rotational and linear velocity(ies) of the bat at contact with the ball, or a factor that relates rotational and linear velocity(ies), or a factor that relates the relative peak times of linear and/or rotational bat velocity with respect to each other or with respect to the instant of contact with the ball, or a factor that is dependent on error of bat position and/or orientation with respect to a nominal or desired position at contact or at another critical point of the swing, or several factors may each be dependent on error of bat position and orientation with respect to a nominal or desired position at contact or at another critical point of the swing, or a factor that is dependent on the acceleration of one or more points on the bat at a critical instant or phase of a swing, or the time required for the bat to move from one critical point to another during the swing.

Note that in the foregoing discussion, position may represent the three-dimensional position of a body or it may represent a single position component (for example x, y, or z component) in space. Likewise, velocity may represent the three-dimensional velocity of a point on a body or it may represent a single velocity component (for example x, y, or z component) of a point on a body in space. Likewise position may refer to orientation (rotation about any or all of the axes) or position of a point, and velocity may refer to angular velocity about one or more axes. Likewise acceleration may refer to a single component of acceleration of a point on the bat or multiple or the total acceleration in space.

In addition to analyzing performance based on bat and or ball motion, player body motion may also be considered in the analysis. For example, the performance index may be extended such as in equation 5:

$$J = W_{ball_1}BEF_1 + W_{ball_2}BEF_2 + \ldots + W_{bat_1}CF_1 + W_{bat_2}CF_2 + \ldots W_{body_1}MF_1 W_{body_2}MF_2 + \quad (5)$$

where $MF_i$ is a 'motion factor' that is dependent on motion of the player's body and $W_{body_i}$ is a constant weighting factor used in the optimization. Any of the weighting factors may be zero, effectively eliminating a particular term from the performance index. For example, if the system in use is analyzing a particular motion that does not include equipment such as a bat (e.g. a throwing motion), then the $W_{bat_i}$ terms can all be zero and the performance index can be a concise measure of that motion. The $MF_i$ terms may be measured, for example with video, radar, or IMU attached to specific body parts as depicted in FIG. 6. Example body motion factors include rotation of the hips, movement the head, movement of one or both of the shoulders, movement of one or both feet. In addition, a body movement factor may be dependent on movement of a part of the body in relation to the movement of the bat, including the timing of specific movements of the body in relation to timing of bat movements.

Equation 5 may be further generalized to equation 6, $$J = W_{equip_1}EF_1 + W_{equip_2}EF_2 + W_{equip_3}EF_3 + \ldots W_{body_1}MF_1 + W_{body_2}MF_2 + \quad (6)$$

where $EF_i$ is an 'equipment factor' that may be measured or calculated, such as $BEF_i$ and $CF_i$ in Equations 4 and 5, or any measured or calculated parameter related to equipment motion, and $W_{equip_i}$ represents a corresponding weighting factor for that parameter. It is generally understood that each $EF_i$ and $MF_i$ may appear as a nonlinear term in the equations, for example as a squared term, a square-root term, or other nonlinear function of $EF_i$ or $MF_i$, in addition to or instead of the linear terms shown as examples in equations herein.

It is understood that the control factors, ball exit factors, and motion factors described above may be obtained by methods other than inertial measurement as with the IMUs described here. Such methods may include video motion analysis, radar, and optical methods. In aspects, one or more of equipment-based factors $EF_i$ (e.g., ball exit factors $BEF_i$, control factors $CF_i$, etc.), motion factors $MF_i$, or J can be averaged over two or more swings to obtain a value representing an average over those swings. Additionally, if multiple swings are used to obtain a value of J, other factors can be included in J, such as a percentage of swings in which the bat makes contact with the ball, which can be included as additional terms in the performance index J with their own weights (alternatively, one or more can be included as a scale factor by which J is multiplied). In a non-baseball setting, the one or more motion factors can be tailored to specifics of that motion, and if appropriate, one or more equipment-based factors can be used in connection with equipment associated with that motion (e.g., golf club and golf ball, football, etc.).

In addition to performing an optimization based on a single performance index and a single bat parameter (e.g. J vs. bat moment of inertia), one may perform, for example, a two-variable optimization. For example one may consider how J varies versus two bat parameters such as bat mass and bat mass moment of inertia, or bat mass and bat length, or bat length and bat moment of inertia, and find the optimum bat parameters by maximizing or minimizing J; or one may consider relationships, such as $J_1$ versus one bat parameter (e.g. bat mass, length, or moment of inertia) and $J_2$ (a second performance index differing from $J_1$) versus a second bat parameter, and find optimum bat parameters by maximizing and/or minimizing the different performance indices.

In addition to the general method of testing described above (which uses multiple bats and multiple swings), IMUs can enable testing methods and algorithms that involve fewer bats. For example, by using inertial measurement data one may apply inverse-dynamics methods to extract applied forces to determine optimal bat parameters for a specific player.

Besides using algorithms described herein as a bat selection tool, one may use them as a bat design tool in which the algorithms provide design parameters for the optimal bat (e.g. the spatial distribution of the bat's mass, selection of the optimal bat handle diameter, selection of bat knob characteristics, etc.).

This general bat selection method may be used for other sports equipment selections that involve collisions with an object (e.g. golf clubs, tennis racquets, lacrosse sticks, hockey sticks, etc.). In a non-baseball setting, the one or more optional motion factors can be tailored to specifics of the motion being studied, and if appropriate, one or more equipment-based factors can be used in connection with equipment associated with that motion (e.g., golf club and golf ball, tennis racquet and tennis ball, etc.).

Additionally, the performance indices described herein can be used as a means of analyzing and "grading" any sports motion or other motion (e.g., rehabilitation), not just for bat or other equipment selection as described above. For example, one may wish to analyze a pitching motion with respect to some standard, and the performance index can provide a way to compare the motion in terms of a single number that can takes into account many (potentially thousands) pieces of data in the motion.

Another potential baseball application of the subject innovation is in connection with throwing analysis (e.g., pitching, etc.), which can use one or more IMUs. With IMUs it is possible to obtain much more data about pitchers than a radar gun can provide, including arm speed (maybe a player has good arm speed but does not get maximum velocity on the ball because of issues with grip or release), release information or data (arm slot, wrist and hand motion), consistency of motion from pitch-to-pitch, etc. In aspects, these features can be obtained using a single IMU placed on say, the pitcher's hand or arm. In this case no instrumentation of the ball (equipment) is needed, in contrast to conventional systems and methods.

Figure 8:
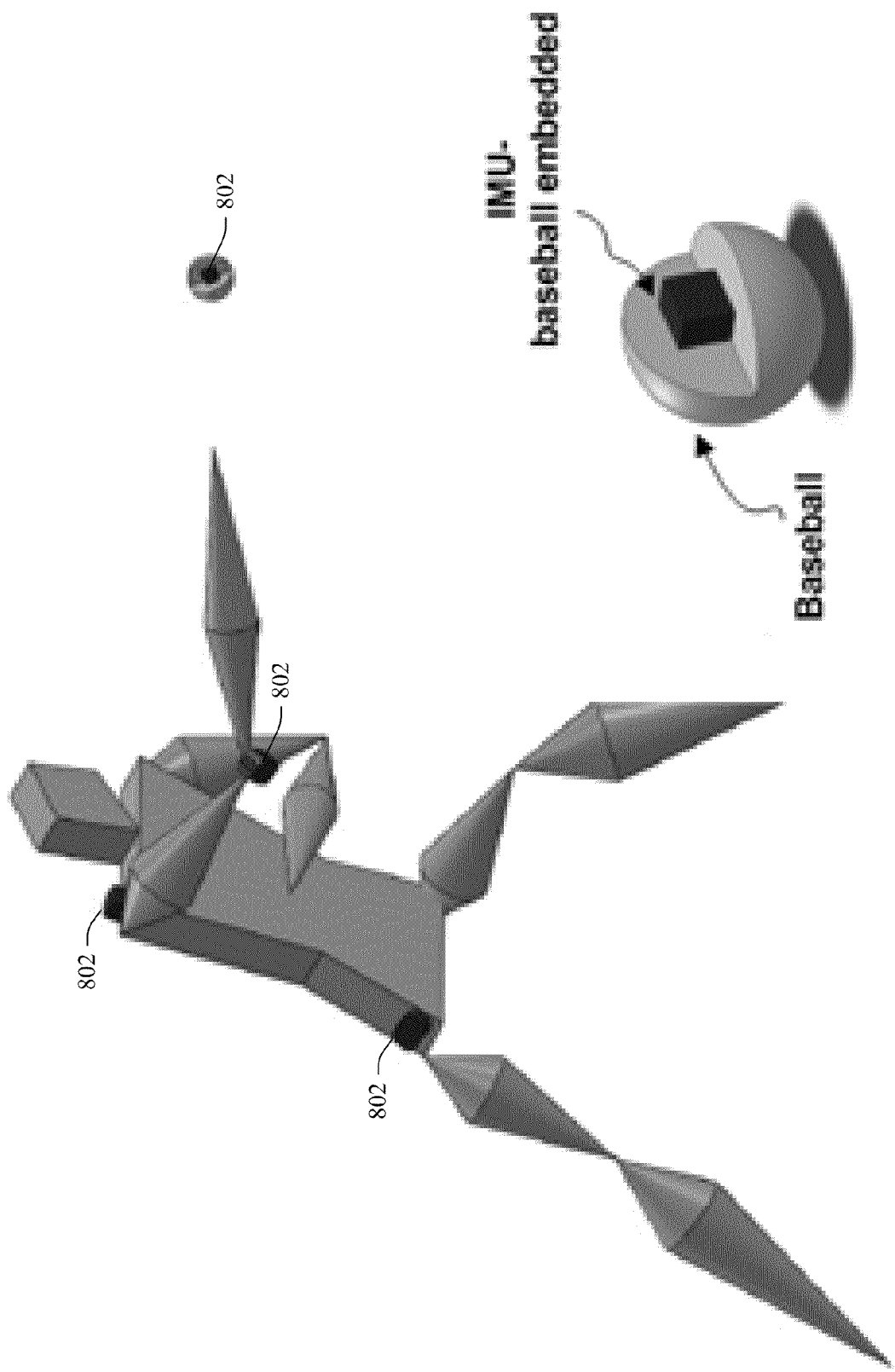
FIG. 8 illustrates multiple IMUs can be used on a pitcher or on the pitcher and ball in accordance with aspects of the innovation.

In aspects, multiple IMUs can be used on a pitcher or on the pitcher and ball, as shown in FIG. 8. The full pitching motion can be quantitatively analyzed (and the motion can be reconstructed) using multiple IMUs 802 placed on key points of the pitcher's body (e.g. hand, forearm, shoulder, hips, etc.) to collect detailed motion data, as depicted in FIG. 8. This motion data can be used in a variety of ways.

One potential application is in performance evaluation. By using performance indices, for example, as shown in equation 5, or by using a portion or all of the raw or analyzed data, a pitcher can be benchmarked and compared from year to year or within a year, compared before and after injury, or the motion data can be used to evaluate a prospect.

Training is another application. Detailed feedback can be provided to a pitcher or a coach about pitching motions, e.g., arm slot, ball release, consistency from pitch-to-pitch. As the size of IMUs reduces with further advances, eventually the hardware for this will be small enough for a pitcher to wear during the game, so feedback can be obtained, and the raw data can be distilled into specific features that are desired.

One example application of analysis of motion data is in evaluating a pitcher's "pitching efficiency." That is, it is unlikely that every pitcher gets the most out of his throwing ability, due to inefficiencies in grip, release, or mechanics. Analysis can determine if, for example, based on arm and hand speed and motion, a pitcher could impart more velocity (or spin, etc.) on the ball if a better grip or release were used.

Another aspect in which the subject innovation can be applied to pitching is in injury prevention. IMUs provide acceleration information, which is directly related to forces in joints and limbs. Cumulative effects of high forces (particularly the "wrong" forces) can result in injury. IMUs can enable better understanding of the cause of injuries in pitching, and future wearable IMUs can provide in-game tracking and feedback of forces exerted on joints, and potentially lead to prevention of injury. Even simple implementations of a system or method of the subject innovation can provide much more detailed information than is currently available for pitchers.

Additionally, much like the case of injury prevention, the motion and forces experienced by a pitcher (or other person) who is recovering from injury can be tracked to provide information that can be used to guide the recovery process, potentially getting pitchers back in the game sooner, and stronger than they would be otherwise.

In various aspects, the subject innovation has additional features not available in conventional systems. In connection with aspects of the subject innovation, for example, data can be collected from multiple players, thereby building a database with which to compile data for the player or for populations of players, to be used for multiple purposes such as determining preferred motions, determining general statistics for a particular population, or for monitoring change in a particular player's motion with practice, or with rehabilitation, etc.

In various aspects, the subject innovation can involve using IMU devices described above that can be wired or wirelessly connected, either automatically or through manual connection, to one or more local or remote servers (e.g. through the Internet). Each IMU can become a data collection "node." The one or more servers can house data collection software and one or more databases with which to log raw data, determine derived data, extract specific parts of the data, and store data for later retrieval.

What has been described above includes examples of the innovation. It is, of course, not possible to describe every conceivable combination of components or methodologies for purposes of describing the subject innovation, but one of ordinary skill in the art may recognize that many further combinations and permutations of the innovation are possible. Accordingly, the innovation is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system that facilitates motion tracking, comprising:
a set of one or more inertial measurement units (IMUS), wherein each IMU of the set is attached to and records motion data associated with one of a person or at least one piece of equipment;
a control component that receives and synchronizes the motion data recorded by each IMU of the set; and
an analysis component that analyzes the synchronized motion data in connection with a motion standard and generates feedback based at least in part on the analysis;
wherein the motion data is associated with a swing of a baseball bat; the generated feedback is based at least in part on a moment of inertia of the baseball bat and the generated feedback comprises a recommendation of at least one of a length or a weight of an optimal baseball bat.

2. The system of claim 1, wherein the generated feedback is based at least in part on a value of a performance index.

3. The system of claim 2, wherein the performance index is based at least in part on one or more of a motion factor or an equipment-based factor.

4. The system of claim 1, wherein the generated feedback comprises one or more design parameters associated with a design of an optimal baseball bat.

5. The system of claim 1, wherein the motion data is associated with a pitch of a baseball.

6. The system of claim 5, wherein the motion data comprises at least one of an arm speed associated with the pitch, grip data associated with the pitch, or release data associated with the pitch.

7. The system of claim 1, wherein the determined feedback comprises a comparison between the synchronized motion data and benchmark motion data.

8. A method of motion tracking, comprising:
placing one or more inertial measurement units (IMUs) on at least one of a person or one or more pieces of equipment;
recording motion data associated with the at least one of the person or the one or more pieces of equipment;

synchronizing the recorded motion data;

analyzing the synchronized motion data in connection with a motion standard, wherein the analyzing is performed by a processor operatively coupled to a memory; and generating feedback based at least in part on the analyzed motion data; wherein the recorded motion data is associated with a swing of a baseball bat; the generated feedback is based at least in part on a moment of inertia of the baseball bat and the generating feedback comprises recommending of at least one of a length or a weight of an optimal baseball bat.

9. The method of claim 8, further comprising deriving additional motion data, wherein the additional motion data comprises at least one of a linear or an angular velocity.

10. The method of claim 8, wherein the generated feedback is based at least in part on a speed of the baseball bat at the time of a collision with a baseball.

11. The method of claim 8, wherein the motion data is associated with a pitch of a baseball.

12. A method of motion tracking, comprising:

recording motion data associated with the at least one of a person or one or more pieces of equipment;

synchronizing the recorded motion data; analyzing the synchronized motion data in connection with a performance index, wherein the performance index is based at least in part on one or more of a motion factor or an equipment-based factor, wherein the analyzing is performed by a processor operatively coupled to a memory; and generating feedback based at least in part on the analyzed motion data; wherein the recorded motion data is associated with a swing of a baseball bat; the generated feedback is based at least in part on a moment of inertia of the baseball bat and the generating feedback comprises recommending of at least one of a length or a weight of an optimal baseball bat.

13. The system of claim 1, wherein the generated feedback comprises one or more design parameters associated with a design of an optimal piece of equipment.

14. The system of claim 1, wherein the generated feedback comprises a recommendation of one or more parameters of an optimal piece of equipment.

* * * * *